United States Patent
Wirsing et al.

[11] Patent Number: 6,092,436
[45] Date of Patent: Jul. 25, 2000

[54] ANCHORAGE FOR MOTION-TRANSMITTING CABLE ASSEMBLY

[75] Inventors: Timothy Alan Wirsing, Saginaw; Mark A. Steffe, Canton, both of Mich.

[73] Assignee: General Motors Corporation, Detroit, Mich.

[21] Appl. No.: 09/123,266

[22] Filed: Jul. 28, 1998

[51] Int. Cl.[7] .................................................. F16C 1/14
[52] U.S. Cl. ........................ 74/502.4; 74/501.5 R; 403/353
[58] Field of Search .................. 74/501.5 R, 502.4, 74/502.6, 500.5; 403/353, 319, 316

[56] References Cited

U.S. PATENT DOCUMENTS

| | | | |
|---|---|---|---|
| 2,154,046 | 4/1939 | Kost | 74/502.4 X |
| 4,011,770 | 3/1977 | Webb | 74/501 R |
| 4,635,498 | 1/1987 | Zimmermann et al. | 74/501 R |
| 4,805,479 | 2/1989 | Brightwell | 74/502.4 |
| 4,951,524 | 8/1990 | Niskanen | 74/502.4 |
| 5,010,781 | 4/1991 | Kirk et al. | 74/502.4 |
| 5,218,881 | 6/1993 | Nowak | 74/502.6 |
| 5,230,257 | 7/1993 | Nowak | 74/502.4 |
| 5,233,881 | 8/1993 | Sayen et al. | 74/502.4 |
| 5,272,934 | 12/1993 | Chegash et al. | 74/502.4 |
| 5,347,882 | 9/1994 | Klotz | 74/502.6 X |
| 5,461,938 | 10/1995 | Froling et al. | 403/353 X |
| 5,553,818 | 9/1996 | Wild | 248/56 |
| 5,579,662 | 12/1996 | Reasoner | 74/502.4 |
| 5,596,908 | 1/1997 | Hall | 74/502.4 |
| 5,613,406 | 3/1997 | Rutkowski | 74/502.6 |
| 5,615,584 | 4/1997 | Irish | 74/502.6 |
| 5,953,963 | 9/1999 | Wirsing et al. | 74/502.4 |

FOREIGN PATENT DOCUMENTS

| | | | |
|---|---|---|---|
| 365243 | 4/1990 | European Pat. Off. | 74/502.4 |

*Primary Examiner*—Mary Ann Battista
*Attorney, Agent, or Firm*—Kathryn A. Marra

[57] ABSTRACT

A motion-transmitting assembly has a cable movable within a tubular sheath anchored on a panel. The panel has a keyhole-shaped aperture therein including a relatively large access opening portion which communicates with a relatively narrower slot portion. An anchor mounted on the sheath has a base wall adapted to engage against the face of the panel and a foot suspended from the base wall by a shank. The foot is smaller than the access opening portion of the aperture to permit insertion of the foot through the access opening portion. The shank is smaller than the slot portion to permit sliding movement of the anchor along the keyhole-shaped aperture so that the foot becomes engaged with the underface of the panel. The anchor also has an integral spring finger projecting from the base wall in a direction parallel with the direction of the sliding movement of the anchor. The spring finger is self-biased to be snapped into the access opening to engage with the panel and block retrograde sliding movement of the anchor within the aperture toward the access opening to thereby anchor the sheath on the panel.

4 Claims, 4 Drawing Sheets

ANCHORAGE FOR MOTION-TRANSMITTING CABLE ASSEMBLY

TECHNICAL FIELD

This invention relates to a motion-transmitting assembly of the type having a cable movable within a tubular sheath and provides an improved anchor for mounting the sheath within a keyhole-shaped aperture of a mounting panel.

BACKGROUND OF THE INVENTION

It is well known to transmit motion between remotely situated mechanisms via a cable which is slidably guided within a tubular sheath so that the cable can be pushed and pulled. The ends of the sheath are suitably anchored on a mounting panel so that the ends of the sheath remain stationary during the push and pull motion of the cable.

The present invention provides a new and improved anchor for anchoring the sheath within a keyhole-shaped aperture of the mounting panel.

SUMMARY OF THE INVENTION

A motion-transmitting assembly has a cable movable within a tubular sheath anchored on a panel. The panel has a keyhole-shaped aperture therein including a relatively large access opening portion which communicates with a relatively narrower slot portion. An anchor mounted on the sheath has a base wall adapted to engage against the face of the panel and a foot suspended from the base wall by a shank. The foot is smaller than the access opening portion of the aperture to permit insertion of the foot through the access opening portion. The shank is smaller than the slot portion to permit sliding movement of the anchor along the keyhole-shaped aperture so that the foot becomes engaged with the underface of the panel. The anchor also has an integral spring finger projecting from the base wall in a direction parallel with the direction of the sliding movement of the anchor. The spring finger is self-biased to be snapped into the access opening to engage with the panel and block retrograde sliding movement of the anchor within the aperture toward the access opening to thereby anchor the sheath on the panel.

DESCRIPTION OF THE PREFERRED EMBODIMENT

Figure 1:
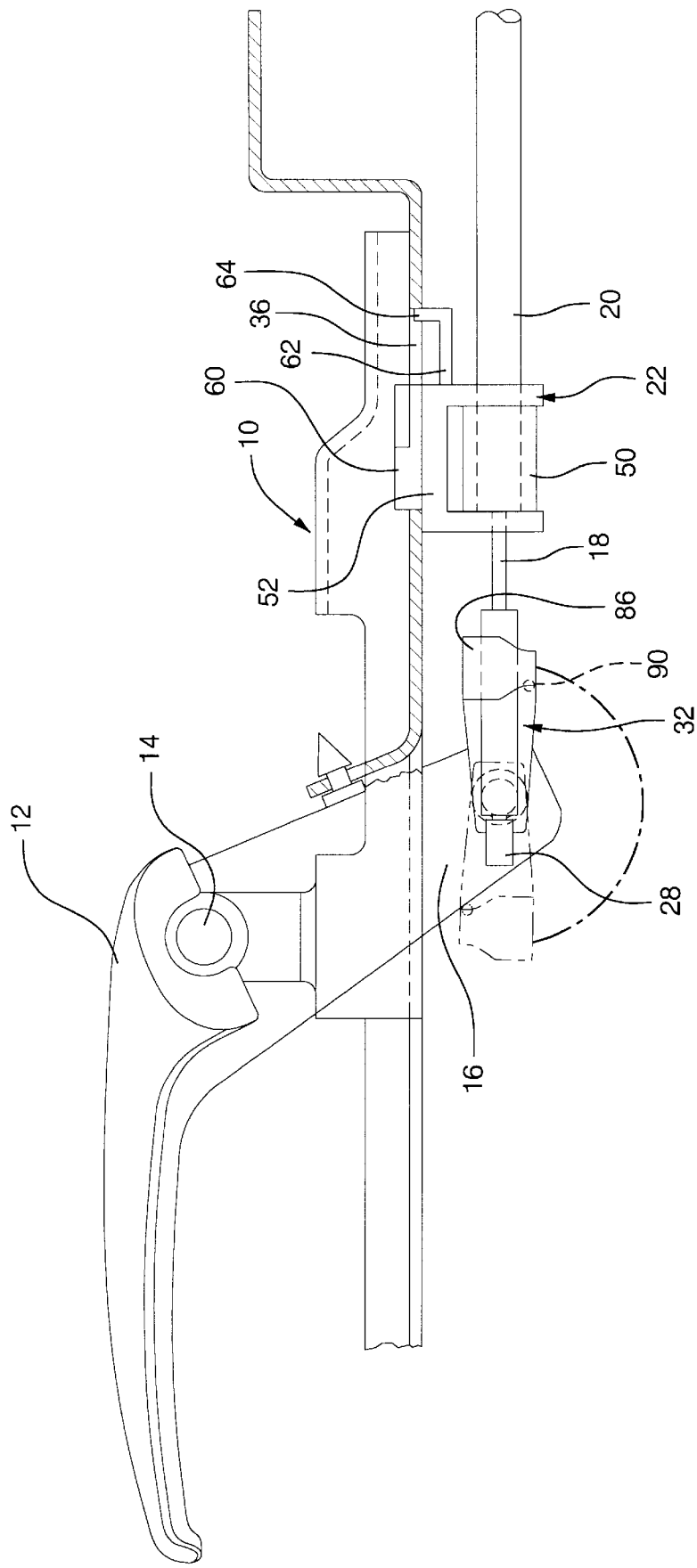
FIG. 1 is a top elevation view of the motion-transmitting assembly having the cable connected to a vehicle door handle and the sheath anchored on a mounting panel.
Figure 4:
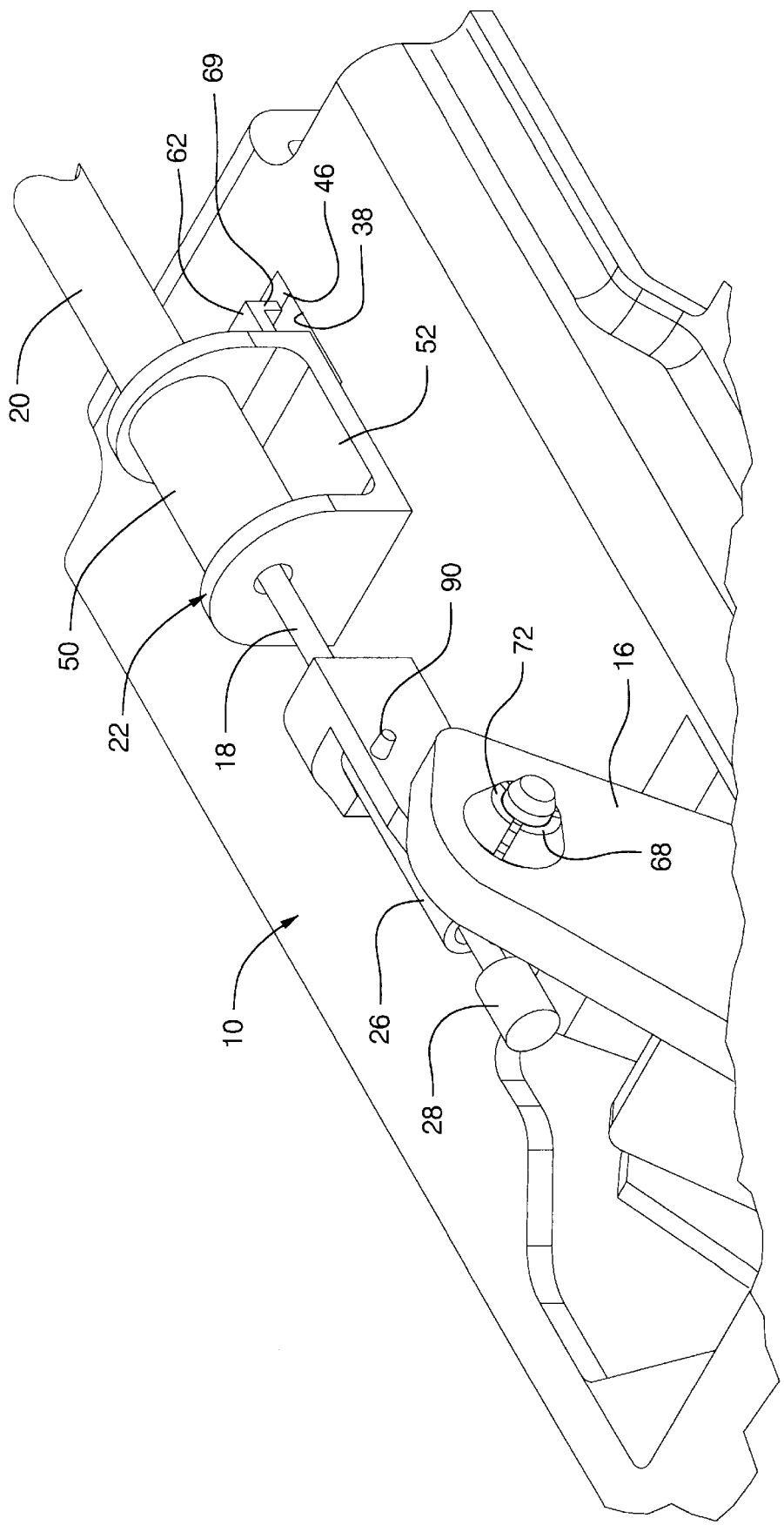
FIG. 4 shows the sheath having been anchored on the support panel by an anchor carried by the end of the sheath and also shows the cable having been attached to the lever by the retainer clip.

Referring to FIGS. 1 and 4, a mounting panel 10 of stamped steel is suitably mounted on a vehicle door, not shown. A door handle 12 is pivotally mounted on the mounting panel 10 by a pivot 14. Door handle 12 includes an actuating arm 16 which reaches inside the door for connection to a motion-transmitting mechanism which will unlatch the vehicle door latch upon pivoting of the door handle 12.

Figure 2:
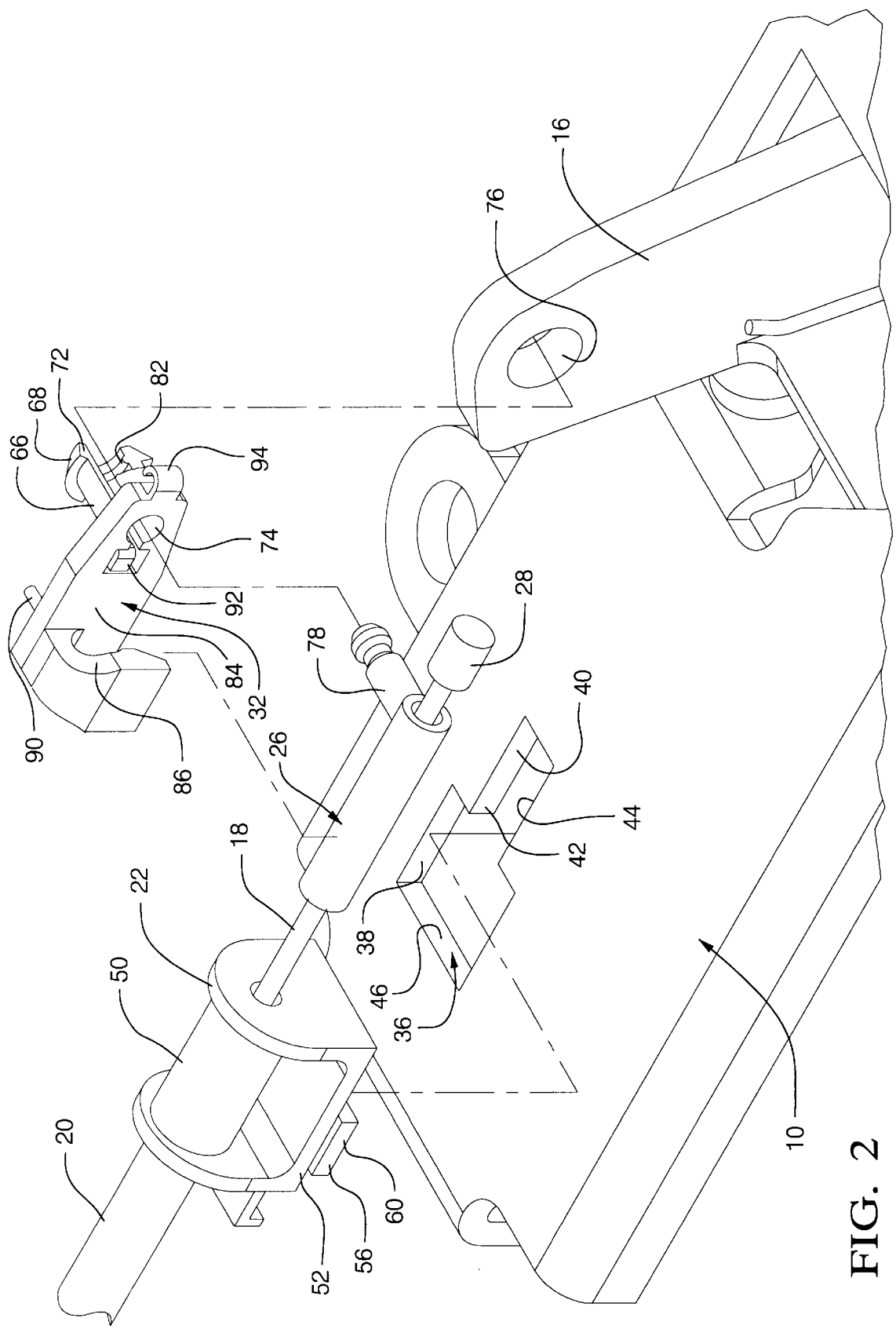
FIG. 2 is a perspective view showing the preassembled condition of the assembly.
Figure 3:
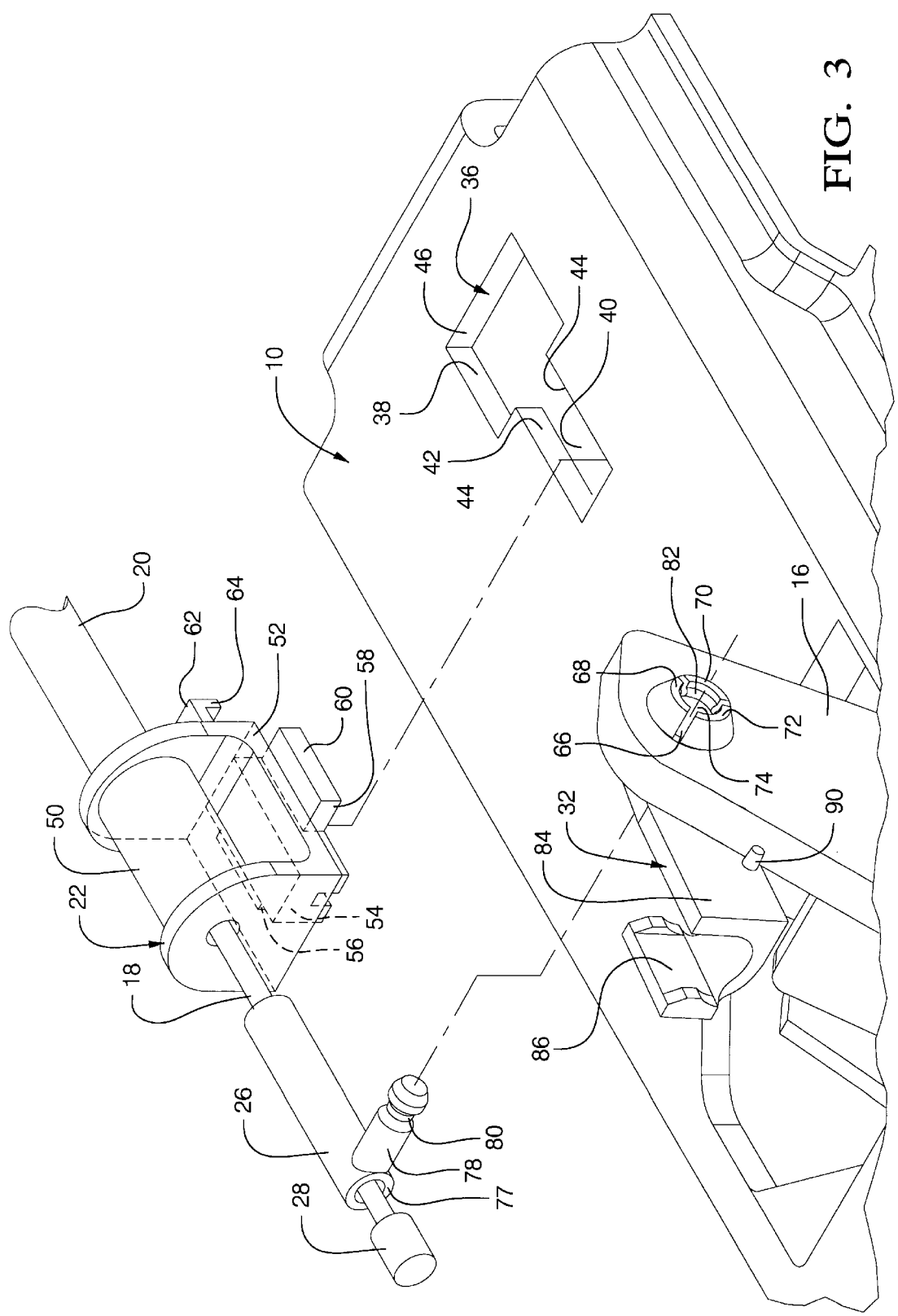
FIG. 3 shows a retainer clip installed within an aperture in the door handle lever.

The motion-transmitting mechanism includes a cable 18 which is slidable within a tubular sheath 20. The sheath 20 is anchored on the mounting panel 10 by a molded plastic anchor 22 affixed to the end of the sheath 20. As best seen in FIGS. 2 and 3, a cable fitting 26 is captured on the end of cable 18 by a ferrule 28 and is connected with the actuating arm 16 of handle 12 by a retainer clip 32.

As best seen in FIGS. 2 and 3, the mounting panel has a keyhole-shaped aperture generally indicated at 36 and including a relatively large access portion 38 and a relatively narrow slot portion 40. The slot portion is defined by parallel, shaped-apart side walls 42 and 44. The access opening portion 38 has a rear wall 46. As best seen in FIG. 3, the anchor 22 is of molded plastic construction and includes a tubular body 50 in which the sheath 20 is press fit. The anchor 22 also includes a base wall 52 having a depending shank 54 which supports lateral flanges 56 and 58 to thereby define a foot 60 suspended below the base wall 52 by the shank 54. It will be understood that the foot 60 is smaller in dimension than the access opening portion 38 of the keyhole-shaped slot 36 so that the foot 60 of the anchor 50 may be inserted into the access opening portion 38. The shank 54 is narrower than the space between the side walls 42 and 44 so that the shank includes parallel extending walls which engage with the side walls 42 and 44 of the narrow slot portion 40 to prevent the anchor 22 from rotating in the aperture 26. The anchor 22 may be slid along the panel 10, causing the shank 54 to enter the narrow slot portion 40 of the keyhole aperture 36 and the foot 60 to thereby become captured beneath the mounting panel 10.

The anchor 22 also includes an integrally-molded spring finger 62 which projects from the rear of the anchor 50 and has a locking tab 64 which becomes biased into the access opening portion 38, as best seen in FIG. 1, to block the anchor 22 against retrograde rightward movement in a direction which would permit its disengagement from the support panel. Thus, it is seen that the anchor 22 is conveniently and reliably attached to the support panel 10.

As best seen in FIGS. 2 and 3, the retainer clip 32 includes a cylindrical body 66 defined by yieldable prongs 68, 70 and 72 having a central bore 74 reaching therethrough. As seen in FIG. 3, the retainer clip 32 is installed into the arm 16 of door handle 12 by inserting the prongs 68, 70 and 72 through an aperture 76 provided in the actuating arm 16. As best seen in FIGS. 2 and 3, the cable fitting 26 includes a barrel 77 through which the cable 18 is slidable and has a stud 78 projecting laterally from the barrel 77 and having a necked-down portion 80 defining a groove. The stud 78 is pressed through the aperture 76 of the retainer clip 32 so that locking shoulders 82, which project into the bore 74 from the prongs 68, 70 and 72, become captured in the groove of the necked-down portion 80 of the stud 78, thereby retaining the stud 78 within the actuating arm 16. In addition, the retainer clip 32 has a swingover arm 84 which reaches from the cylindrical body 66 and has a snap fit receptacle 86 thereon which becomes clipped over the barrel 77 of the cable fitting 26 when the retainer clip 32 is swung over from the rest position of FIG. 3 to the installed position of FIG. 4. Accordingly, the connection between the cable fitting 26 and the actuating arm 16 is assured by both the capture of the stud 78 within the bore 74 of the retainer clip 32 and by the receptacle 86 of the clip capturing the barrel 77 of the cable fitting 26 so that the stud 78 cannot be moved axially within the bore 74.

As seen in FIG. 3, the retainer clip 32 has a small, integrally molded stop arm 90 integrally molded on the swingover arm 84 which rests upon the actuating arm 16 to conveniently position the retainer clip 32 in readiness for installation of the cable fitting 26. In addition, it is seen in FIG. 2 that the swingover arm 32 carries a pair of integrally-molded spring fingers 92 and 94 which will bear lightly upon the actuating arm 60 to take up slack between the retainer clip 32 and the actuating arm 16.

While this invention has been described in terms of some specific embodiments, it will be appreciated that other forms can readily be adapted by one skilled in the art. Accordingly, the scope of this invention is to be considered limited only by the following claims.

What is claimed is:

1. In a motion-transmitting assembly having a cable movable within a tubular sheath anchored on a panel, the improvement comprising:

the panel having a keyhole-shaped aperture therein having a relatively large access opening portion communicating with a relatively narrower slot portion; and an anchor mounted on the sheath and having a base wall adapted to engage against the face of the panel and a foot suspended from the base wall by a shank, with the foot being smaller than the access opening portion of the panel aperture to permit insertion of the foot through the access opening portion and the shank being smaller than the slot portion to permit sliding movement of the anchor along the keyhole-shaped aperture so that the foot becomes engaged with the under face of the panel, said anchor also having an integral spring finger projecting from the base wall in a direction parallel with the direction of sliding movement of the anchor, said spring finger being self-biased into the access opening portion to engage with the panel and block retrograde sliding movement of the anchor within the of the panel to thereby anchor the sheath on the panel.

2. The improvement as defined in claim 1 wherein the base wall has a trailing end that is transverse to the direction of sliding movement of the anchor and the integral spring finger projects from the trailing end.

3. The improvement as defined in claim 1 wherein the anchor is of one-piece molded plastic construction.

4. In a motion-transmitting assembly having a cable movable within a tubular sheath anchored on a panel, the improvement comprising:

the panel having a keyhole-shaped aperture therein having a relatively large access opening portion communicating with a relatively narrower slot portion; and an anchor of one piece molded plastic construction mounted on the sheath and having a base wall adapted to engage against the face of the panel and a foot suspended from the base wall by a shank, the foot being smaller than the access opening portion of the panel aperture to permit insertion of the foot through the access opening portion, the shank being smaller than the slot portion and having parallel extending side walls that engage side walls of the slot portion to permit sliding movement of the anchor along the keyhole-shaped aperture so that the foot becomes engaged with the under face of the panel, the base wall of the anchor having a trailing end that is transverse to the parallel extending side walls of the shank and an integral spring finger projecting from the trailing end in a direction parallel with the direction of sliding movement of the anchor, and the spring finger being self-biased into the access opening portion to engage with the panel and block retrograde sliding movement of the anchor within the aperture of the panel to thereby anchor the sheath on the panel.

\* \* \* \* \*